United States Patent [19]

Dutruel et al.

[11] Patent Number: 4,975,907
[45] Date of Patent: Dec. 4, 1990

[54] METHOD AND DEVICE FOR THE ASYNCHRONOUS TRANSMISSION OF DATA BY PACKETS

[75] Inventors: Albain Dutruel, Pringy; Christian Ryckeboer, Annecy, both of France

[73] Assignee: Compex, societe anonyme, Pringy, France

[21] Appl. No.: 346,889

[22] Filed: May 2, 1989

[30] Foreign Application Priority Data

May 6, 1988 [FR] France ............................... 88 06673

[51] Int. Cl.$^5$ ................................................ H04J 3/02
[52] U.S. Cl. ................................... 370/85.2; 370/94.1
[58] Field of Search ....................... 370/85, 94, 91, 92, 370/93, 85.1–85.15, 94.1, 85.2

[56] References Cited

U.S. PATENT DOCUMENTS

| 4,063,220 | 12/1977 | Metcalfe | 370/85.2 |
| 4,210,780 | 7/1980 | Hopkins et al. | 370/85 |
| 4,409,592 | 10/1983 | Hunt | 370/85.2 |
| 4,809,269 | 2/1989 | Gulick | 370/85.2 |

FOREIGN PATENT DOCUMENTS 2551278 3/1985 France .
82/04366 12/1982 PCT Int'l Appl. .

OTHER PUBLICATIONS

IEEE Transactions on Consumer Electronics, vol. CE-32, No. 1, Feb. 1986, pp. 1–7, R. Hamabe et al.
IEEE Transactions on Consumer Electronics, vol. CE-29, No. 3, Aug. 1983, pp. 297–304, F. W. Gutzwiller "Homenet: A control network for consumer applications".

Primary Examiner—Douglas W. Olms
Assistant Examiner—Christopher O. Edwards
Attorney, Agent, or Firm—Ratner & Prestia

[57] ABSTRACT

A method and device are provided for the asynchronous transmission of data packets, consisting in transmitting messages in the asynchronous mode, the messages comprising a beginning of message character, a character designating the address of the addressee, possibly a character designating the address of the sender, possibly characters containing the significant information of the message, and an end of message character. The beginning of message and end of message characters are formed of a continuous pulse of a length equal to the number of the significant bits of a normal message character increased by two bits. Such a pulse is recognized by the frame control circuits, in the case where the characters are without parity bits; they are recognized by the parity control signals in the case where the characters are provided with parity bits.

11 Claims, 4 Drawing Sheets

METHOD AND DEVICE FOR THE ASYNCHRONOUS TRANSMISSION OF DATA BY PACKETS

BACKGROUND OF THE INVENTION

1. Field of the Invention

The present invention relates to logic communication networks formed of transceiver equipment and more particularly networks for data packet multipoint communication. In such a communication mode, each transceiver may communicate with each of the other transceivers of the network, by transmitting data packets over a data transmission carrier common to all the transceivers. Each data packet contains the address of its addressee, similarly to a letter or a packet in the postal network.

2. Description of the Prior Art

Numerous types of data communication networks are known of the multipoint packet type. The data transmission carrier is formed of a network of one or more transmission media, such as coaxial cables, optical fibers or others, connected together and permanently to a plurality of transceivers. The transceivers may be all purpose computers, specialized computers (microprocessors), devices such as input-output stations or distant terminals or different other peripheral members.

One of the main functions which a multipoint packet type data transmission network of probabilist type must provide is the management of collisions. The data transmission carrier can in effect generally transmit only a single packet at a time. If two transmitters decide to send a message simultaneously, collision occurs in the data transmission carrier, so that the data is not received correctly. To manage these collisions, networks are already known using the principle of contention. According to this principle, each transceiver connected to the network can only transmit if no other transmission is in progress.

The high speed communication needs between computers have led to developing networks using synchronous transmission techniques, working for example at speeds of several megabauds. In these techniques, coding of the signals generally makes it possible to regenerate the clock at reception, i.e. the transmitted data conveys the clock signal of the sender, and this clock signal is used by the addressee for sampling the bits received and deserializing the information. In this type of connection, all the characters are transmitted following each other, without dead times and the beginning of the transmission is generally characterized by sending one or a succession of bits used by the receiver for synchronizing itself. Any interruption in transmission causes desynchronization of the addressee.

The document FR-A-2 306 478 describes such a synchronous transmission network of packet multipoint type. In this device, a message transmission begins by a synchronization bit. An interruption at any time is interpreted as the end of the message, the network placing itself immediately in the rest condition. This device operates with a code conveying the clock of the sender. The messages contain the addresses of the sender and of the addressee. Should a collision occur in the network, the senders interrupt themselves and take up transmission again after a wait of random duration, this duration being possibly practically zero.

The document EP-A-0023105 also describes such a device using the contention principle, but in which the message is transmitted in a particular code containing packets of eight bits. The transmission is of synchronous type, the message conveying the clock. No addressee's address is sent, so that all the receivers are addressees of all the messages. The particular code makes it necessary to wait at least the duration of a packet before taking up an interrupted transmission again.

The document GB-A-2 013 452 describes a determinist type device in which the sending equipment designates its successor, the different equipment being thus enabled to transmit one after the other in a modifiable order. It is a question of a technique very different from contention.

For communication needs, less rapid than the synchronous techniques, and leading to less expensive circuits, data communication networks have been developed of multipoint packet asynchronous type. Such a technique is described in the document WO 82/04366. In such asynchronous type transmission networks, making it possible to construct installations with lower flowrate but much less expensive than synchronous techniques, detection of the availability of the network is more delicate. In fact, in such an asynchronous mode transmission, the messages are formed of a succession of characters separated by intervals during which no signal is transmitted, so that it is insufficient to check the absence of signals to know if a message is not being transmitted.

To solve this problem, the document WO 82/04366 describes a method and device in which the message, formed of a succession of asynchronous characters, is conditioned by each transmitter which inserts, before the first character of the message, a particular beginning of message signal, and which inserts, after the last character of the message, a particular end of message signal. On each character or signal transmission, the sender compares the signals corresponding to the characters transmitted and the signals detected simultaneously on listening to the network; if the signals are identical, it continues the transmission of the message; if the signals are different, it transmits an end of message character and it immediately interrupts the transmission of the message, and remains listening for a random time greater than a minimum waiting time. In this document, the beginning of message and end of message signals are interruption characters such as the interruption characters currently used in communication techniques of asynchronous type. These interruption characters comprise a continuous signal of a duration appreciably greater than the duration of the characters forming the message, so that their form is very different from all the codes used in the characters forming the message.

Such a technique makes it necessary to provide, in each transmitter, special circuits for generating the interruption signal at the beginning and end of message; it further requires having, in each receiver, special circuits for detecting the interruption signals. These special circuits are not normally required for simple transmission of messages over an asynchronous network. The result is a relative complication of the circuits.

Furthermore, the technique described in this document makes it necessary to wait, at the end of message, for a time greater than the interruption character duration, before beginning a new transmission again. Since the interruption characters are relatively long, the result is a substantial loss of transmission time.

SUMMARY OF THE INVENTION

The present invention has particularly as object, in multipoint packet asynchronous communication networks, to provide a transmission method in which detection and processing of the beginning of message characters makes it possible, in a probabilist way, in the case of a collision, for one of the transmitters to continue its transmission without being disturbed and for the other transmitters to stop the transmission of their beginning of message character without modifying significantly the residual waveform on the network. The result is that, in the majority of situations, the network remains active since one of the transmitters, determined in a probabilist way, validly continues its transmission. There only remains a few very rare cases of collisions which cannot be detected on reception of the beginning of message character and whose detection will be made subsequently. It can be seen that the method of the present invention leads to a very substantially improvement in the useful occupation rate of the network, without there being need to have recourse to a determinist hierarchy of priorities.

According to another object, the present invention teaches the use of message conditioning making generation and processing possible by means of appreciably simplified circuits. In particular, the beginning and end of message signals are generated and processed by circuits which themselves generate and process the significant characters of the message. By significant characters of the message are meant the characters which contain the information to be transmitted between the transmitter and the receiver.

According to another object of the present invention, conditioning of the message makes it possible to avoid transmission time losses, by the fact that interruption characters do not need to be used whose duration is relatively long.

Another object of the present invention is to introduce a possibility of priorities between the different transmitters, promoting the transmission of priority messages before the transmission of non priority messages. However, despite the introduction of such priorities, the transmission of messages in accordance with the present invention keeps its fundamentally probabilist character.

To attain these objects as well as others, the present invention provides a method for a multipoint type asynchronous series communication of logic messages between several transceivers connected in parallel to a network, the messages being formed of a succession of bits, without incorporated clock, grouped in coded characters separated by intervals, each character comprising a beginning of character bit and an end of character bit, the messages comprising a beginning of message character, possibly one or more characters designating the address of one or more addressees, possibly one or more characters for designating the address of the sender, possibly significant characters, and an end of message character, the method comprising a first reception phase during which the sender listens to the signals present on the network and inhibits transmission as long as a signal is present, a second transmission phase during which the sender transmits a message and proceeds with the simultaneous reception of the signals and characters present in the network, comparison between these signals and the transmitted signals, and interruption of the transmission of the message if the signals present and transmitted differ, the interrupted transmission being begun again subsequently after a new initial reception phase of random duration; when the signals received and the transmitted signals differ, the sender inhibits the transmission of the message, so that no character is transmitted over the network from the inhibition order.

In one embodiment, no bit is transmitted over the network from the inhibition order.

Preferably, the beginning of message and end of message characters comprise a continuous pulse whose duration is equal to the duration of the whole of the significant bits forming an intermediate character of the messages increased by the duration of two bits.

It so happens that such a continuous pulse is always recognizable by the system which may deduce therefrom the presence of a beginning or end of message.

In a first embodiment, the intermediate characters of the messages, such as the significant characters or the address characters, comprise, in accordance with a standard usual in asynchronous transmission matters, a beginning of character bit, n significant bits and an end of character bit. The beginning and end of character bits are always different; very often, the beginning of character signal is 0, whereas the end of character signal is 1. In this embodiment, the recognizable beginning and end of message characters, formed of a continuous pulse of a length equal to the whole of the binary signal and of the beginning and end of character signals of a significant character, may be generated simply by the same circuit as the circuits which generate the significant characters of the message; these recognizable beginning and end of message characters are detected automatically by a frame control circuit. Frame control circuits are generally used in asynchronous transmission and generate an error signal when they receive a character not having a form in accordance with the usual asynchronous transmission standard, namely a character not having a beginning of character bit at 0 and an end of character at 1. The output signal of the frame control circuit is used for generating the beginning and end of message detection signal.

In a second embodiment, the intermediate message characters comprise a beginning of character bit, n significant bits, a parity bit, and an end of character bit, in accordance with a usual asynchronous transmission standard. In this embodiment:

the significant characters comprise an odd parity bit,
the beginning and end of message characters comprise a beginning of character bit at 0, n bits also at 0, and a parity bit also at 0 corresponding to an even parity, the end of character bit being at 1 as in the usual standard;
such beginning and end of message characters are thus recognizable with respect to the intermediate characters and are detected automatically by the parity control means, whose output signal is used for generating the beginning and end of message character detection signal by the message deserialization and deconditioning means, these beginning and end of message characters are readily produced by the same circuits as the circuits producing the intermediate characters of the messages.

In a third embodiment, the intermediate message characters also comprise a beginning of character bit, n significant bits, a parity bit, and an end of character bit, according to the usual asynchronous transmission standards. In this embodiment:

the intermediate characters of the message comprise an even parity bit;

the recognizable beginning and end of message characters comprise a beginning of message bit at 0, n significant bits at 1 a following bit at logic state 1 and a last bit at logic state 1; n must be even;

such beginning and end of message characters are also recognizable and detectable by the parity control means, whose output signal is used for generating the beginning and end of message character detection signal and is processed by the message deserialization and deconditioning means. Such beginning and end of message characters are readily produced by the usual circuits for producing the intermediate characters of the message.

The embodiment may be preferred in which the beginning and end of message characters are pulses of sufficient duration at 0. In fact, such pulses are readily differentiated from practically the whole of the parasite pulses which may appear in the network. The result is a substantial reduction in the risk of errors.

Also, the embodiments may be preferred comprising the generation and detection of parity bits. The presence of these signals makes possible an efficient control of the transmission quality, the reliability of which control is in no wise affected by the fact that, in accordance with the invention, detection of the parity errors is used for also detecting the beginning and end of message characters.

In the embodiments of the present invention, a priority may also be introduced between the messages to be transmitted over the network. This priority is introduced, in accordance with the present invention, by varying the predetermined minimum time which a transmitter must wait before transmitting its message, after the end of reception of signals over the network.

BRIEF DESCRIPTION OF THE DRAWINGS

Other objects, features and advantages of the present invention will be clear from the following description, of particular embodiments, with reference to the accompanying figures in which.

DESCRIPTION OF THE PREFERRED EMBODIMENTS

Figure 1:
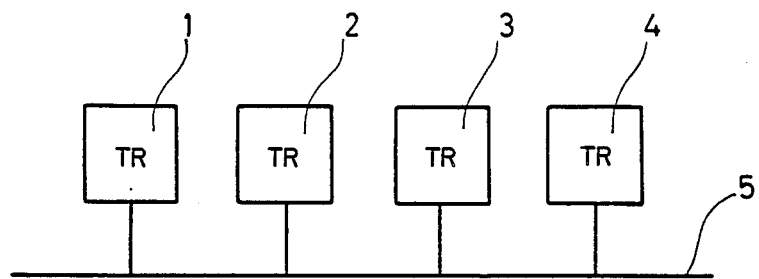
FIG. 1 shows schematically a transceiver network in accordance with the present invention.

The method of the invention makes it possible, as shown schematically in FIG. 1, for several transceivers to communicate over the same network in asynchronous mode. The transceivers 1 to 4 are connected in parallel to the same line 5 or communication medium. The communication medium shown here in the form of a simple conductor is a logically passive series data transmission medium or a single channel medium which will be given the generic term of line hereafter.

Each transceiver may in itself comprise several stages: an interface stage in direct connection with line 5, a message transmission and reception stage, a user stage formed for example by an all purpose computer, a microprocessor or peripheral equipment.

Line 5 may be a line with one or more conductors. Furthermore, without departing from the scope of the present invention, wire-less transmission networks may be constructed, the transmitters 1 to 4 being connected in parallel through short wave links, or optical connections such as infrared, or optical fibers.

Figure 2:
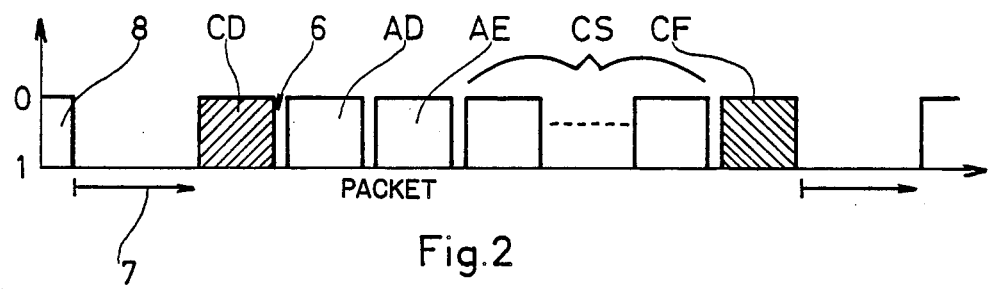
FIG. 2 shows the waveforms of a message to be transmitted in the form of a packet in accordance with the present invention.

In FIG. 2, the construction of a message in accordance with the method of the present invention has been shown. This message comprises a beginning of message signal CD, formed of a special character which will be described hereafter, and an end of message signal CF which is also a special character which will be described hereafter. Between the beginning of message signal CD and the end of message signal CF, the assembly of intermediate characters forming the message are inserted in sequence. By way of example, the beginning of message character CD is followed by one or more characters AD designating for example the address of the addressee(s) of the message, then one or more characters AE designating for example the address of the sender and then the significant characters CS of the message, or characters containing the information to be transmitted. The last significant character is followed by the end of message character CF.

Figure 3:
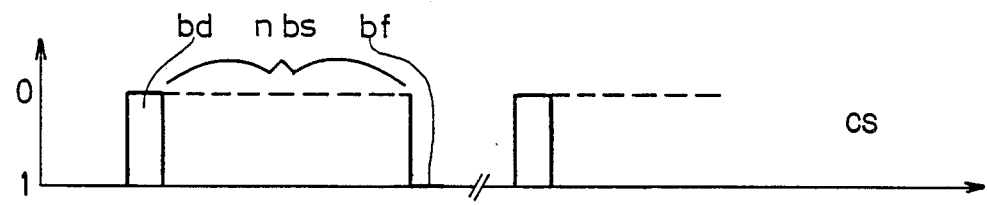
FIG. 3 is one example of a waveform characterizing an intermediate character to be transmitted in a first embodiment of the present invention.

As is general practice in asynchronous transmission matters, the characters in accordance with the present invention have a form similar to that shown in FIG. 3: the character comprises a beginning of character bit bd, followed by n significant bits bs, the coding of which makes it possible to designate the character to be transmitted, the last significant bit being followed by an end of character bit bf. In accordance with the usual standard for asynchronous transmission matters, the beginning of character bit BD is at 0 and the end of character bit BF is at 1, for an intermediate character such as the significant character CS of the message. A number n may for example be chosen equal to 8. A different number however may be chosen without departing from the scope of the present invention.

Figure 4:
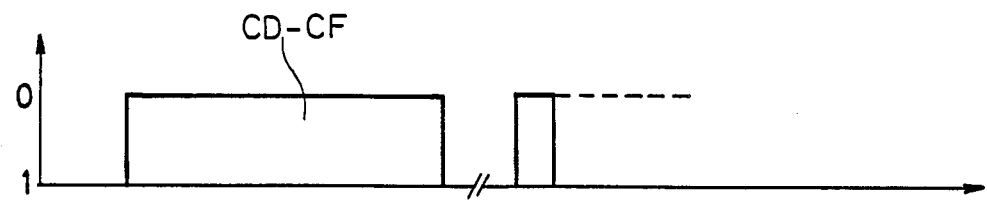
FIG. 4 shows the waveform of a beginning or end of message in accordance with the present invention, to be associated with an intermediate character of FIG. 3.

In the above case where the intermediate characters such as the significant character CS of the message do not comprise any parity bit, the total duration of a character is equal to the duration of (n+2) bits. In this first embodiment, the beginning of message CD and end of message CF characters are chosen such as is shown in FIG. 4; these characters CD and CF are a continuous pulse lasting the whole duration of a normal character, i.e. for the duration covering the beginning bit bd, the n significant bits bs, and the end of character bit bf.

Such a beginning of message CD and end of message CF signal is recognizable among all the possible forms of significant CS or address AD or AE character of the message. The present invention uses this possibility of recognizing such a character for simply and efficiently conditioning the messages to be transmitted asynchronously over the network. For that, the receivers of the present invention advantageously comprise means for detecting the frame errors in the characters received. These means are well known in asynchronous communication techniques and make it possible in particular to check that each character comprises a beginning of character bit bd at 0 and an end of character bit bf at 1, these two bits being separated by the correct number n of bits which may each have any logic value. When such a frame control device receives a beginning of message CD or end of message CF character described above, it automatically produces a frame error signal. In this embodiment, the internal logic of the receiver is designed so that, when the receiver detects a character in which all the bits are in logic state 0 and detects a frame error in this same character, it deduces therefrom that it is a question of a beginning of message CD or end of message CF character.

Figure 5:
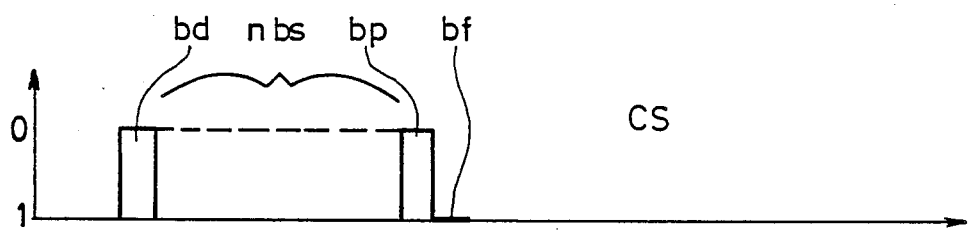
FIGS. 5 and 6 illustrate the waveforms of an intermediate character and a beginning and end of message, in a second embodiment of the present invention.
Figure 6:
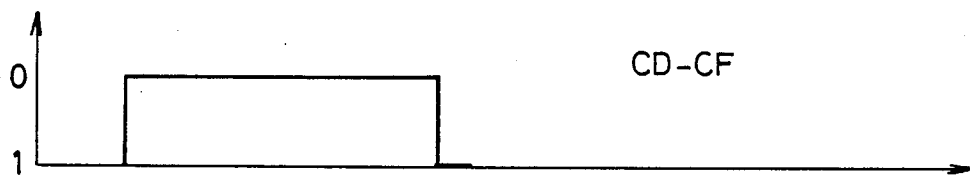

In FIGS. 5 and 6 a second embodiment of the present invention has been shown for conditioning messages. In this second embodiment, the intermediate character of a message is represented in FIG. 5 and the beginning of message CD or end of message CF characters are shown in FIG. 6.

The intermediate characters such as the significant character CS comprise a beginning of character bit bd, followed by n significant bits bs. The last significant bit is followed by a parity bit bp, itself followed by the end of character bit bf. In this embodiment, the character bp is an odd parity bit, i.e. the number of bits at 1 obtained by counting the signals bs and bp is uneven.

The beginning of message CD and the end of message CF characters in this embodiment, shown in FIG. 6, are formed of a single continuous pulse, at logic state 0, during the whole duration of a beginning of message bit bd, n significant bits bs and the parity bit bp.

In relation with the forms of signals shown in FIGS. 5 and 6, the transmitters of the present invention advantageously comprise a parity control device, formed in a way known per se and widely used in the asynchronous transmission field. Such a parity control device, which is informed that the parity bit bp is normally an odd parity signal for the normal characters of the message, produces a parity error signal when it receives a signal CD or CF such as described in connection with FIG. 6. Thus, in the receiver, the parity error detection device may be used for generating the beginning of message character CD and the end of message character CF detection signals. For that, the internal logic of the receiver is used for recognizing a beginning or end of message character when the character received comprises all its significant bits bs at logic state 0, and presents a parity error.

Figure 7:
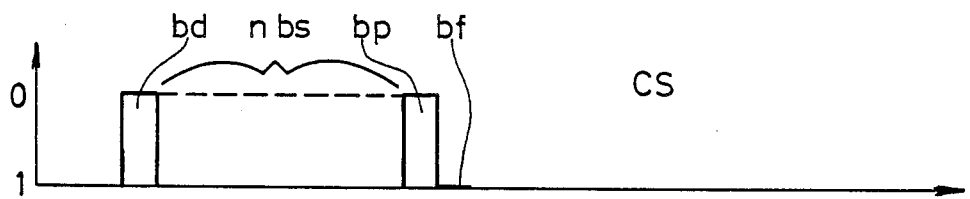
FIGS. 7 and 8 shows the waveforms of an intermediate character and a beginning or end of message character in a third embodiment of the present invention.

In a third embodiment of the present invention, described in connection with FIGS. 7 and 8, the intermediate characters such as the significant message character CS comprise a beginning of character bit bd, n significant bits bs, a parity bit bp and an end of character bit bf; in this embodiment, the parity bit bp is an even parity bit and the number n must be even.

Figure 8:

In relation with such an intermediate character format, the beginning of message CD or end of message CF character is represented in FIG. 8; this character comprises a beginning of character bit bd at logic state 0, followed by n bits at logic state 1 and two last bits at logic state 1, forming a continuous pulse at logic state 1, whose duration is equal to the duration of (n+2) bits.

As in the preceding embodiment, the receivers of the present invention advantageously comprise parity control means. On reception of a beginning of message CD or end of message CF character such as shown in FIG. 8, the parity control means detect a parity error and the signal which they produce may be used as a beginning of message CD or end of message CF character detection signal. For that, the internal logic of the receiver is used for recognizing a beginning or end of message character when the character received comprises all its significant bits bs at logic state 1, and presents a parity error. This embodiment functions provided that n is even.

Referring to FIG. 2, all the signals and characters forming a message in accordance with the present invention are formed in one of the ways described above, and are separated by intervals such as interval 6 during which no signal is transmitted over the network.

Before beginning the transmission of a message such as the message shown in FIG. 2, a sender must first of all make sure that no transmission is in progress then respect a waiting time, shown by arrow 7, after the last signal 8 detected on the network. The waiting time 7 must have a duration greater than the predetermined minimum waiting time. This minimum waiting time is advantageously at least equal to the transmission time of a character over the network, increased by the usual internal processing time of a transmitter circuit between the end of transmission of a character and the beginning of transmission of the next, and increased by the propagation time of the signals between the end points of the network.

The interval such as interval 6 between characters of the same message may have an essentially variable-length, this length being possibly very small even substantially zero.

During transmission of a message, and at each transmission of characters forming this message, the sender compares the signals corresponding to the characters to be transmitted and the signals detected simultaneously by listening. Depending on the result of this comparison, if the signals are identical, the sender continues transmission of the message. On the other hand, if the signals are different, the sender interrupts the transmission of the message then remains listening for a waiting time and begins transmission again after this waiting time. The waiting time must be different for each transceiver so that if several senders are waiting to transmit while a third is working, no systematic collision occurs on resumption of transmissions. Preferably, the waiting time is always greater than the predetermined minimum waiting time and has a random duration so as not to introduce a hierarchy between the different transceivers.

During the phase for comparing the signals corresponding to the transmitted character and the signals detected simultaneously by listening by the sender, the comparison may be made at the end of transmission of the character. Thus, for this comparison, the usual logic circuits for comparison of the characters may be used, which leads to inexpensive constructions.

It may however be preferred to make these comparisons at the end of transmission of each bit contained in the character, or during such transmission, which substantially accelerates the detection of errors or collisions. Generally, all comparison methods are possible.

During the initial listening phase, the sender must check that no message is being transmitted. This check is made preferably by verifying that no character has been received during the initial listening phase and that the network is in the rest condition at the moment when the sender envisages beginning transmission.

In a way known per se, it is also possible, in accordance with the present invention, to provide a phase for immediately producing an acknowledgement of reception signal sent by the addressee to the sender so as to occupy the network for a minimum time. The acknowledgement message may be transmitted before the end of the predetermined minimum waiting time which follows the message received.

One of the fundamental aspects of the transmission of messages in accordance with the present invention is its probabilist character, i.e. the fact that, in the case of collision, the sender who succeeds in continuing the transmission of his message is determined, in the large majority of cases, in a completely random fashion, i.e. depending on its arrival rank in the network.

However, this fundamental probabilist character of the transmission is not incompatible with the introduction of priorities.

A first way of introducing such priorities is to modify, as a function of the message to be transmitted, the random waiting time which a transmitter must wait before transmitting a message after the last signal received over the network. To illustrate this possibility, let us assume that two transmitters each have a message to transmit, the first transmitter wishing to transmit a relatively urgent message, the second transmitter wishing to transmit a non urgent message. In this case, the random waiting time which the first transmitter must wait is fixed in a variation range whose maximum duration is short and the random waiting time which the second transmitter must wait is fixed in a variation range whose maximum duration is relatively long. It will be readily understood that under these conditions, the first transmitter will probably wait for a shorter time than the second transmitter before taking up again the transmission after an interruption or after the initial listening phase. The first message thus has priority over the second message. This priority does not however take away the probabilist nature of the transmission. In fact, if two messages, with similar priority, corresponding to predetermined random waiting times with identical variation ranges, the transmission order between the two messages will again be chosen in a probabilist way.

In the preceding example, it will be readily understood that cases may arise where the non priority message will succeed in being transmitted before the priority message. If a stricter compliance with the priority is desired, at least two separate variation ranges may be defined, without overlapping, for the random transmission waiting time after reception of the first signal. For example, for a priority message, the random transmission waiting time of the first transmitter will be fixed in a range extending from 10 microseconds to 100 microseconds and the random waiting time of the second transmitter of a non priority message will be fixed in a range between 150 to 250 microseconds. Under these conditions, it will be readily understood that transmission of the first priority message will certainly take place before transmission of the second non priority message.

Of course, it is possible to provide a succession of more than two variation ranges of the random waiting time, defining a succession of priorities.

The messages having the same degree of priority will be transmitted over the network in a given order in a probabilist way.

Figure 9:
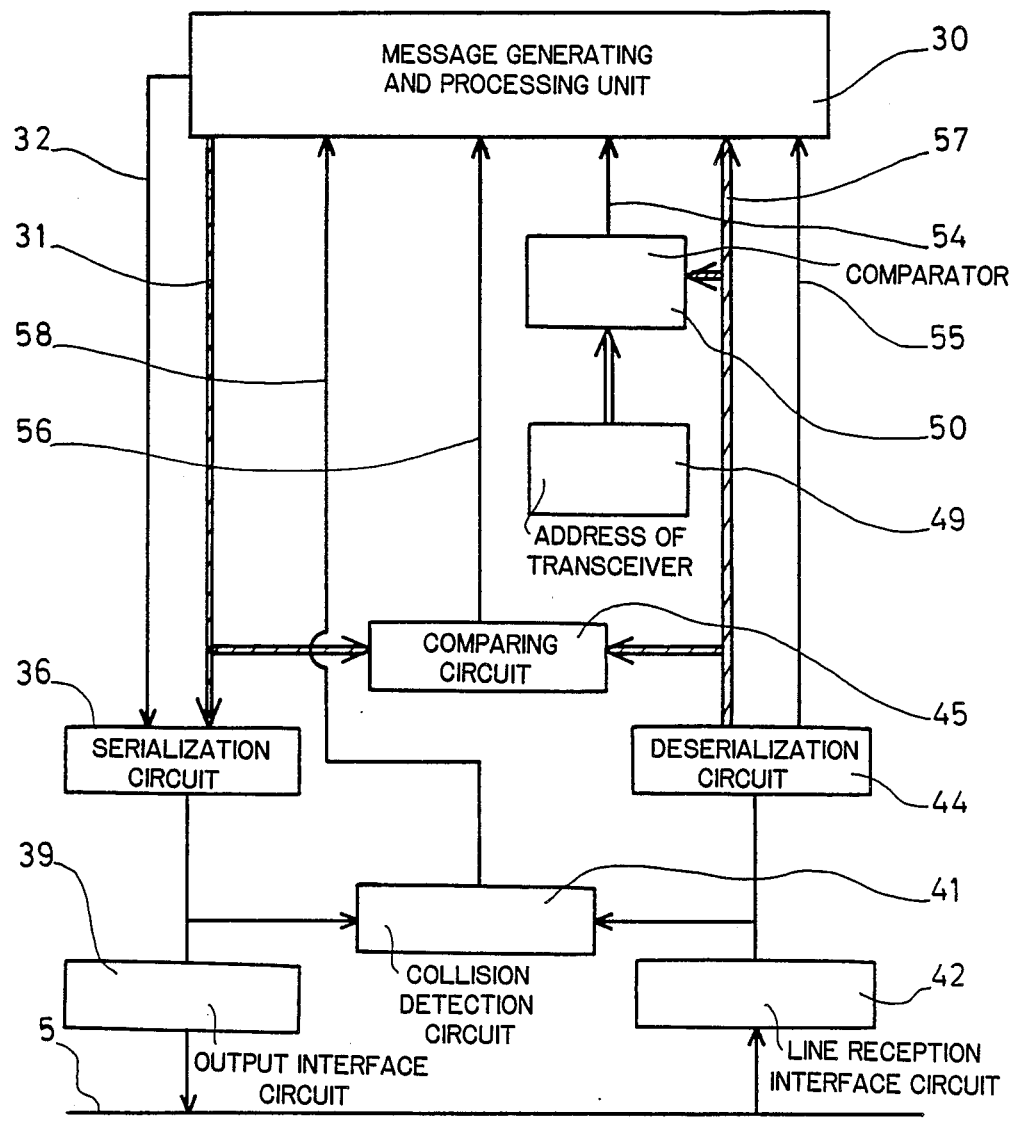
FIG. 9 shows schematically the main functional elements of a transceiver forming the network of the present invention.

FIG. 9 shows the main functional elements of a transceiver in accordance with the present invention. This transceiver comprises a message generating and processing unit 30 comprising several output lines 31, conveying the character to be transmitted to a serialization circuit 36. An output line 32 controls the transmission of characters between the generation unit 30 and the serialization circuit 36. The serialization circuit 36 places in sequence, in series, the bits received from the message generating and processing unit 30 over the output lines 31. The output of the serialization circuit 36 is connected to the input of a line interface circuit 39 whose output is connected to line 5.

The message generating and processing unit 30 also comprises several input lines 57 conveying the character received, an input line 55 controlling the transfer of the characters between a deserialization circuit 44 and the processing unit 30, an input line 56 connected to the output of a circuit 45 comparing the signals transmitted and the signals received by the transceiver. The deserialization circuit 44 is connected to the output of a line reception interface 42, whose input is connected to line 5. An input line 54 of the message generating and processing unit 30 is connected to the output of a comparator circuit 50 for comparing the character received over lines 57 with the address of the transceiver equipment defined by circuit 49.

In the figure, a possible construction has also been shown comprising a collision detection circuit 41. Circuit 41 is used if the comparison between transmitted signal and received signal takes place after or during the transmission of each bit forming the characters. The output of the collision detection circuit 41 is connected to the input 58 of the message generation and processing unit 30.

In the preceding embodiment, the circuits forming the transceiver may be formed by electronic means well known by specialists. For this reason, it is useless to describe in detail the construction of such circuits.

Figure 10:
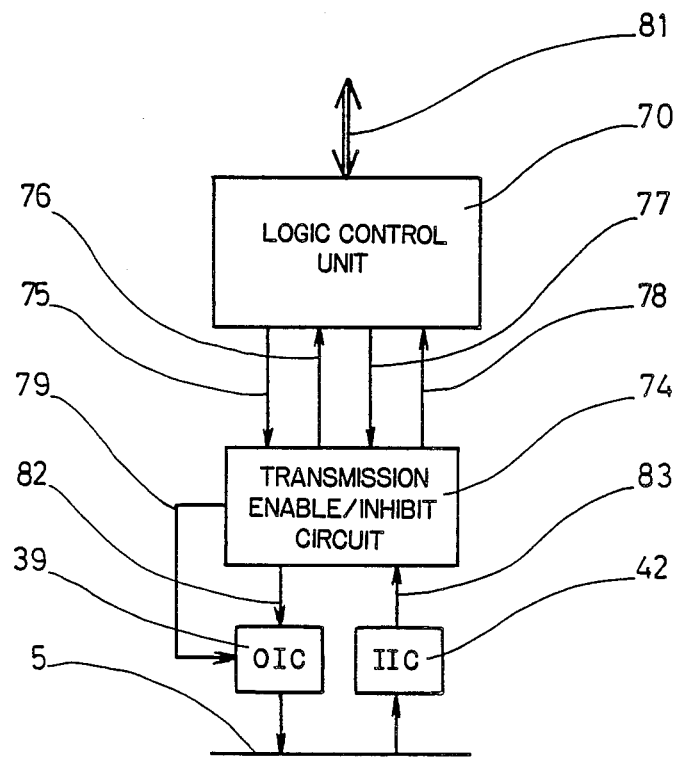
FIG. 10 shows schematically the main elements of a transceiver in accordance with the present invention.

The same functions as described above may be obtained n a particularly simple way using the microprocessor technique, as is described in the following embodiment shown schematically in FIG. 10. In this embodiment, the logic control unit 70 provides the functions of recognizing the addresses of the packets received, stores the packets received and to be transmitted, generates the complete packets by means of an integrated serialization/deserialization deserialization circuit. It is connected in a known way to the equipment connected to the transmission system by a series of lines 81. It is also connected to a logic device 74 whose role is to enable or inhibit transmission over line 5 by means of line 79 which enables the output interface circuit 39, to compare during the transmission the signals transmitted 82 and the signals received 83 at the output of the input interface 42, to detect the collisions and inform the control logic unit 70 over line 78 in the case of collision. Line 75 makes it possible for the logic unit 70 to indicate to device 74 that data is going to be transmitted over line 77. The data received 83 is transmitted to the logic unit 70 over line 76 except when it corresponds to the data transmitted at 77.

The circuit 70 is for example a microprocessor of the 8051 family available from the firm INTEL.

The present invention is not limited to the embodiments which have been more explicitly described but it includes the different variants and generalizations thereof contained in the field of the following claims.

What is claimed is:

1. A method for use in a device for multipoint type of asynchronous series communication of logic messages between several transceivers connected in parallel to a network, the messages being formed of a succession of bits, without incorporated clock, grouped in coded characters separated by intervals, each character comprising a beginning of character bit and an end of character bit, the messages comprising a beginning of message character, at least one character designating the address of an addressee, one or more optional characters designating the address of a sender, optional significant characters, and an end of message character, the method comprising a first reception phase during which the sender listens to the signals which may be present on the network and generates an inhibition order which inhibits transmission as long as a signal is present, a second transmission phase during which the sender transmits a message and proceeds with the simultaneous reception of the signals and characters present in the network, comparison between the received signals and the transmitted signals, and interruption of the transmission of the message if the received signals and the transmitted signals differ, the interrupted transmission being begun again subsequently after a new initial reception phase of random duration, wherein:

when the received signals and the transmitted signals differ, the sender inhibits the transmission of the message so that it transmits no bit over the network after the inhibition order; and the beginning of message and end of message characters comprise a continuous pulse whose duration is equal to the duration of the whole of the significant bits forming an intermediate character of the messages increased by the duration of two bits.

2. The method as claimed in claim 3, wherein:

the current intermediate characters of the messages comprise a beginning of character bit at logic state 0, n significant bits, and an end of character bit at logic state 1, in accordance with the usual asynchronous character transmission standards, the beginning and end of message characters are formed of a continuous pulse, at logic state 0, whose duration is equal to the total duration of a character, including the beginning of character and end of character bits, the character received is interpreted by a transceiver as being a beginning of message or end of message character when the receiver ascertains that this character has a frame error and that all its significant bits are at logic state 0.

3. The method as claimed in claim 1, wherein:

the current intermediate characters of the messages comprise a beginning of character bit, n significant bits, an odd parity bit, an end of character bit, in accordance with the usual asynchronous character transmission standards.

the beginning and end of message characters are pulses formed of a n significant bits at logic state 0, with a parity bit at logic state 0;

the beginning of message and end of message characters are detected, in the receiver, when the receiver ascertains that this character has a parity error and that all its significant bits are at logic state 0.

4. The method as claimed in claim 1, wherein:

the current intermediate characters of the messages comprise a beginning of character bit, n significant bits in even number, an even parity bit, an end of character bit, in accordance with the usual asynchronous character transmission standards, the beginning and end of message characters are pulses formed of a n significant bits at logic state 1, with a parity bit at logic state 1;

the beginning of message and end of message characters are detected, in the receiver, when the receiver ascertains that this character has a parity error and that all its significant bits are at logic state 1.

5. A method for use in a device for multipoint type of asynchronous series communication of logic messages between several transceivers connected in parallel to a network, the messages being formed of a succession of bits, without incorporated clock, grouped in coded characters separated by intervals, each character comprising a beginning of character bit and an end of character bit, the messages comprising a beginning of message character, at least one character designating the address of an addressee, one or more optional characters designating the address of a sender, optional significant characters, and an end of message character, the method comprising a first reception phase during which the sender listens to the signals which may be present on the network and generates an inhibition order which inhibits transmission as long as a signal is present, a second transmission phase during which the sender transmits a message and proceeds with the simultaneous reception of the signals and characters present in the network, comparison between the received signals and the transmitted signals, and interruption of the transmission of the message if the received signals and the transmitted signals differ, the interrupted transmission being begun again subsequently after a new initial reception phase of random duration, wherein:

when the received signals and the transmitted signals differ, the sender inhibits the transmission of the message so that it transmits no character over the network after the inhibition order; and the random duration, which a sender must wait before transmitting a message after the last signal received over the network, is modified as a function of the message to be transmitted.

6. The method as claimed in claim 5, wherein at least two distinct variation ranges are defined, without overlapping, for the random transmission waiting time after reception of the last signal received.

7. A device for the asynchronous series communication, of multipoint type, of logic messages between several transceivers connected in parallel to a network, each transceiver comprising:

means for storing each character forming the message to be transmitted, means for transmitting in series the bits forming the messages, means for receiving and storing the signals received over the network, means for generating the characters designating the address of the sender(s) and that of the addressee, means for comparing the signals corresponding to the message to be transmitted and the signals corresponding to the message received simultaneously by the reception means, means for inhibiting the transmission for a random time if the signals present and transmitted differ, means for organizing the messages into a succession of bits grouped into coded characters, without incorporated clock, each character transmitted comprising a set of significant bits preceded by a beginning of character bit and followed by an end of character bit, timing means for producing inhibition of the transmission for a random time greater than a predetermined waiting time following reception of a preceding signal, means for generating in the transmitter a beginning of message character and means in the receiver for detecting the beginning of message character, means for generating in the transmitter an end of message character and means for detecting in the receiver the end of message character, means for conditioning, in the transmitter, the messages into a succession of characters with a beginning of message character, intermediate characters, and an end of message character, means for deconditioning the messages in the receiver and extracting the intermediate characters, wherein:

the means for producing a beginning of message character are formed by the means themselves generating the intermediate characters of the messages, these means generating a character of the same duration as a current intermediate character, comprising a continuous pulse whose duration is equal to the duration of the set of significant bits forming an intermediate character of the messages, increased by the duration of two bits.

8. The device as claimed in claim 7, wherein the receivers of the device comprise:

frame control means for analyzing each character received, and producing frame errors signals, means for analyzing the character received for producing an enabling signal when all the significant bits of the character received are at logic state 0, processing means receiving the frame error signals and the enabling signals and producing a signal of reception of a beginning of message or end of message character when a frame error signal and an enabling signal are present simultaneously for the character received.

9. The device as claimed in claim 7, wherein the receivers of the device comprise:

odd parity control means for analyzing each character received and producing odd parity error signals, means for analyzing the character received for producing an enabling signal when all the significant bits of the character received are at logic state 0, processing means receiving the odd parity error signals and the enabling signals and producing a signal of reception of a beginning of message or end of message character when an odd parity error signal and an enabling signal are present simultaneously for the character received.

10. The device as claimed in claim 7, wherein the receivers of the device comprise:

even parity control means for analyzing each character received and producing even parity error signals, means for analyzing the character received for producing an enabling signal when all the significant bits of the character received are at logic state 1, processing means receiving the even parity error signals and the enabling signals and producing a signal of reception of a beginning of message or end of message character when an even parity error signal and an enabling signal are present simultaneously for the character received.

11. A device for the asynchronous series communication, of multipoint type, of logic messages between several transceivers connected in parallel to a network, each transceiver comprising:

means for storing each character forming the message to be transmitted, means for transmitting in series the bits forming the messages, means for receiving and storing the signals received over the network, means for generating the characters designating the address of the sender(s) and that of the addressee, means for comparing the signals corresponding to the message to be transmitted and the signals corresponding to the message received simultaneously by the reception means, means for inhibiting the transmission for a random time if the signals present and transmitted differ, means for organizing the messages into a succession of bits grouped into coded characters, without incorporated clock, each character transmitted comprising a set of significant bits preceded by a beginning of character bit and followed by an end of character bit, timing means for producing inhibition of the transmission for a random time greater than a predetermined waiting time following reception of a preceding signal, means for generating in the transmitter a beginning of message character and means in the receiver for detecting the beginning of message character, means for generating in the transmitter an end of message character and means for detecting in the receiver the end of message character, means for conditioning, in the transmitter, the messages into a succession of characters with a beginning of message character, intermediate characters, and an end of message character, means for conditioning the messages in the receiver and extracting the intermediate characters, wherein:

the means for producing an end of message character are formed by the means themselves generating the intermediate characters of the messages, these means generating a character of the same duration as a current intermediate character, comprising a continuous pulse whose duration is equal to the duration of the set of significant bits forming an intermediate character of the messages, increased by the duration of two bits.

* * * * *